United States Patent Office 2,997,410

Patented Aug. 22, 1961

2,997,410

SINGLE CRYSTALLINE ALLOYS

Bernard Selikson, Levittown, Pa., assignor to Radio Corporation of America, a corporation of Delaware No Drawing. Filed May 3, 1954, Ser. No. 427,393
2 Claims. (Cl. 148—32)

This invention relates to single crystalline alloys and to their preparation. Particularly the invention relates to improved alloys of germanium with silicon. A particular aspect of the invention relates to single crystalline germanium-silicon materials useful in the fabrication of semi-conductor devices.

Single crystalline germanium has previously been prepared. Likewise, single crystalline silicon has been prepared. However, the preparation of single crystalline alloys of these elements has not previously been accomplished satisfactorily. Moreover, single crystals of germanium or silicon doped with minute traces of impurities on the order of a few parts per million have been prepared. However, the preparation of alloys practiced according to the present invention involves mixtures ranging upwards of .01% or more of silicon with germanium in single crystalline form.

Single crystalline material has been found to be of great importance in the manufacture of semi-conductor electrical devices such as rectifiers and transistors. In making transistors, it is important that the semi-conductor body utilized have no crystal grain boundary. The productive yield in the manufacture of semi-conductor devices is greatly increased by the use of single crystalline material free from crystal grain boundaries. It is important that the semi-conductor material supplied for making transistors should also comprise single crystal units large enough to be easily utilized and manipulated in the fabrication of semi-conductor devices.

In the commercial manufacture of semi-conductor devices, it is desirable to produce a large number of units, all having substantially the same operating characteristics. In manufacturing these devices, the use of large single crystalline ingots of semi-conductor material contributes greatly to the achievement of this goal. Grains taken from a polycrystalline mass differ in properties such as direction of growth, resistivity, lifetime and mobility. These differences in physical and electrical properties are reflected in variations in devices made from semi-conductor materials cut from polycrystalline sources.

Many different semi-conductor devices utilizing semi-conductive germanium or silicon are known, but the operation of germanium devices is usually subject to relatively severe maximum temperature limitations. Silicon devices have certain electrical disadvantages when compared to those of germanium. The maximum operating temperature of a typical device is determined primarily by the energy gap between the valence band and the conduction band of the semi-conductive material of the device. When the temperature of the device is increased to a value at which thermal energy is sufficient to drive substantial numbers of electrons across the energy gap, the semi-conductive characteristics of the material are adversely affected. For example, the energy band gap of germanium is about 0.71 electron volt and many devices utilizing germanium become substantially inoperative above temperatures as low as 100° C. On the other hand, silicon has a higher energy band gap and its operation as a semi-conductor is not adversely affected by much higher temperatures. Silicon, however, is a relatively more difficult material to prepare in highly pure crystalline form and to fabricate into semi-conductor devices such as transistors. Moreover, the semi-conductive properties of silicon, such as electron mobility, hole mobility and lifetime are considerably inferior to those of germanium.

The new materials of the present invention when utilized in semi-conductor devices have unique desirable properties. The better features of both germanium and silicon are combined in single crystalline germanium-silicon alloys. For example, the band gap values of the alloys fall between those of germanium and silicon. When silicon replaces some of the germanium atoms in the crystal lattice to form a solid solution the lattice parameter is changed and the energy gap value approaches more closely that of silicon. The thermal stability of silicon is thus combined with desirable semi-conductive properties of germanium such as greater lifetimes and mobilities. Another advantage in using germanium-silicon alloys compared to using silicon is that there is less of a problem of interaction between the crucible and the melt from which the crystal is grown.

The present method of manufacturing single crystalline germanium-silicon alloys depends upon a slow rate of crystal growth. In order to allow silicon atoms to replace germanium atoms in the crystal lattice without forming grain boundaries, the rate of crystallization must be about one third the usual rate of germanium crystallization or slower. One aspect of the present invention is the use of an unexpectedly slow rate of crystallization to produce single crystal germanium-silicon alloys.

An object of the present invention is the provision of single crystalline germanium-silicon alloy material suitable for use in semi-conductor devices.

Another object of the present invention is the provision of a method of manufacturing single crystalline semi-conducting germanium-silicon alloy materials.

In accordance with the present invention, germanium-silicon single crystalline alloys are prepared by a technique such as the Czochralski technique described in Crystal Growth by H. E. Buckley, Wiley, New York, (1951).

*Example*

A melt is prepared from 32 grams of germanium having a purity such that it has an electrical resistivity of about 10 ohm centimeters and from 44 milligrams of spectroscopically pure silicon. However, the purity of the germanium may range as low as ½ ohm centimeter resistivity for example, and may be higher than 10 ohm cm. The melt is preheated to approximately 150° C. above the normal crystal growing temperature and then cooled to a temperature about 20° C. above that at which germanium crystals are normally grown. Both the preheated temperature and the growing temperature are different when different percentages of silicon are used.

A single crystal seed of germanium is dipped onto the surface of the melt to form a welded junction with the melt. The seed is preferably held in contact with the melt for an appreciable time before starting crystal growth.

The seed is pulled from the melt at a steady rate of 0.3 mm. per minute. Ordinarily, single crystal germanium is pulled at about 1.0 mm. per minute. The rate at which the germanium-silicon alloy ingot is pulled from the melt can, of course, be varied although the slow growth rate gives good results. By allowing crystal growth to occur slowly the formation of crystal grain boundaries when growing a crystal by the Czochralski technique is more easily avoided.

The orientation of the seed crystal lattice with respect to the melt determines the orientation of the single crystal ingot. When the seed crystal is oriented in the 1:1:1 direction, the single crystalline ingot is also in the 1:1:1 direction.

Impurity atoms present in either the germanium or the silicon of the melt are used to make material suitable for fabrication into semi-conductor devices. In order to produce N-type semi-conductors, impurities such as antimony and bismuth are added to the primary components of the melt. Likewise, gallium and indium when added to the melt give P-type single crystalline semi-conducting germanium-silicon alloy. Traces of these impurities are added to the melt in the same way they are added to pure germanium or pure silicon melts.

The uniformity of distribution of silicon throughout the single crystalline ingot depends upon how much of the melt is consumed in pulling the ingot. When only a small part of a large melt goes into the formation of the ingot, the percentage of silicon throughout the ingot is substantially uniform. However, when the bulk of the melt is pulled into an ingot, the distribution of silicon is not uniform throughout the single crystalline ingot. Single crystalline ingots of germanium-silicon alloy in which the composition of the ingot is substantially uniform can be grown in accordance with the present invention by utilizing a volume of melt which is large compared to that of the crystal which is grown.

A pencil shaped ingot of germanium-silicon alloy produced by this method and using the proportions shown in the example has a composition of 0.3 mol. percent silicon and 99.7 mol percent germanium. The composition of the melt is 0.1 mol percent silicon and 99.9 mol percent germanium. This relation of one part silicon in the melt to three parts of silicon in the ingot indicates a distribution coefficient of silicon in germanium of three. Distribution coefficient $(k)=C_s/C_L$; that is, ratio of concentration of the minor ingredient going into the solid to that remaining in the liquid at the solid-liquid interface.

The single crystalline germanium-silicon alloy material prepared according to the present invention has a distinctly higher band gap value than pure germanium. Germanium has a band gap value of 0.71 electron volt. Single crystalline germanium-silicon alloy of 0.3 mol percent silicon content has an energy band gap value of 0.75 electron volt. Moreover, X-ray diffraction photographs of single crystalline germanium-silicon alloys show a markedly different lattice parameter from that shown by photographs of pure germanium and pure silicon.

Single crystal alloys of germanium with silicon containing a higher proportion of silicon than that described in the example are prepared by using a seed crystal cut from an ingot which contains for example, 0.3 mol percent silicon. By using seed crystals cut from ingots containing successively more and more silicon in proportion to germanium content and appropriate melts, single crystalline alloy material of germanium with silicon can be prepared in different ranges of composition up to any mol percent silicon by weight. For making practical devices it is presently preferred to use alloys with up to about 20 mol percent silicon.

There have thus been described new alloy materials of a single crystalline character made by crystal seed pulling. In particular there have been described new germanium-silicon single crystalline alloy materials and a method of making them.

What is claimed is:

1. A single crystalline ingot of germanium-silicon alloy.

2. A single crystalline ingot of germanium containing silicon as an alloying component in a concentration up to about 20 mol percent.

References Cited in the file of this patent

UNITED STATES PATENTS

| | | |
|---|---|---|
| 1,531,784 | Hazelett | Mar. 31, 1925 |
| 1,541,596 | Skaupy et al. | June 9, 1925 |
| 2,552,626 | Fisher et al. | May 15, 1951 |
| 2,594,998 | Rocco | Apr. 29, 1952 |
| 2,631,356 | Sparks | Mar. 17, 1953 |
| 2,679,080 | Olsen | May 25, 1954 |

OTHER REFERENCES

Z. Anorg. Chem., 241, 1939; 314, 315.

OSRD Report P. B.-5200-No. 14-341, pages 5, 8-10. Declassified Nov. 1, 1944.

Stohr and Klemm: Zeitschrift fur Anorg. und Allgemeine Chem., 241, 305-424, esp. 315, 1939.